Nov. 4, 1952 VIGO VON KROGH SUNDT 2,616,162
METHOD OF MOUNTING LATHE TURRETS
Filed Jan. 7, 1946 3 Sheets-Sheet 1

Vigo von Krogh Sundt
INVENTOR.

BY
ATTORNEY.

Vigo von Krogh Sundt
INVENTOR.

Patented Nov. 4, 1952

2,616,162

UNITED STATES PATENT OFFICE 2,616,162

METHOD OF MOUNTING LATHE TURRETS

Vigo von Krogh Sundt, Madison, Wis., assignor to Gisholt Machine Company, Madison, Wis., a corporation of Wisconsin Application January 7, 1946, Serial No. 639,633

2 Claims. (Cl. 29—148)

This invention relates to a method of turret mounting for lathes.

One of the principal objects of the invention is to increase the accuracy of indexing of the turret by substantially improving the accuracy of the turret mounting to support the turret at the several indexed positions.

Another object of the invention is to improve the freedom from friction in the rotation of the turret to its indexed positions.

Another object is to provide a more accurate fit between the clamping surfaces of the turret without increasing the resistance to rotation when unclamped.

Another object is to more accurately center and align the clamping surfaces with the bearing support for the turret.

Another object is to simplify the assembly of the turret and mounting.

Other objects and advantages will be set forth in the description of the method as applied to the turret construction illustrated in the accompanying drawings.

Figure 1:
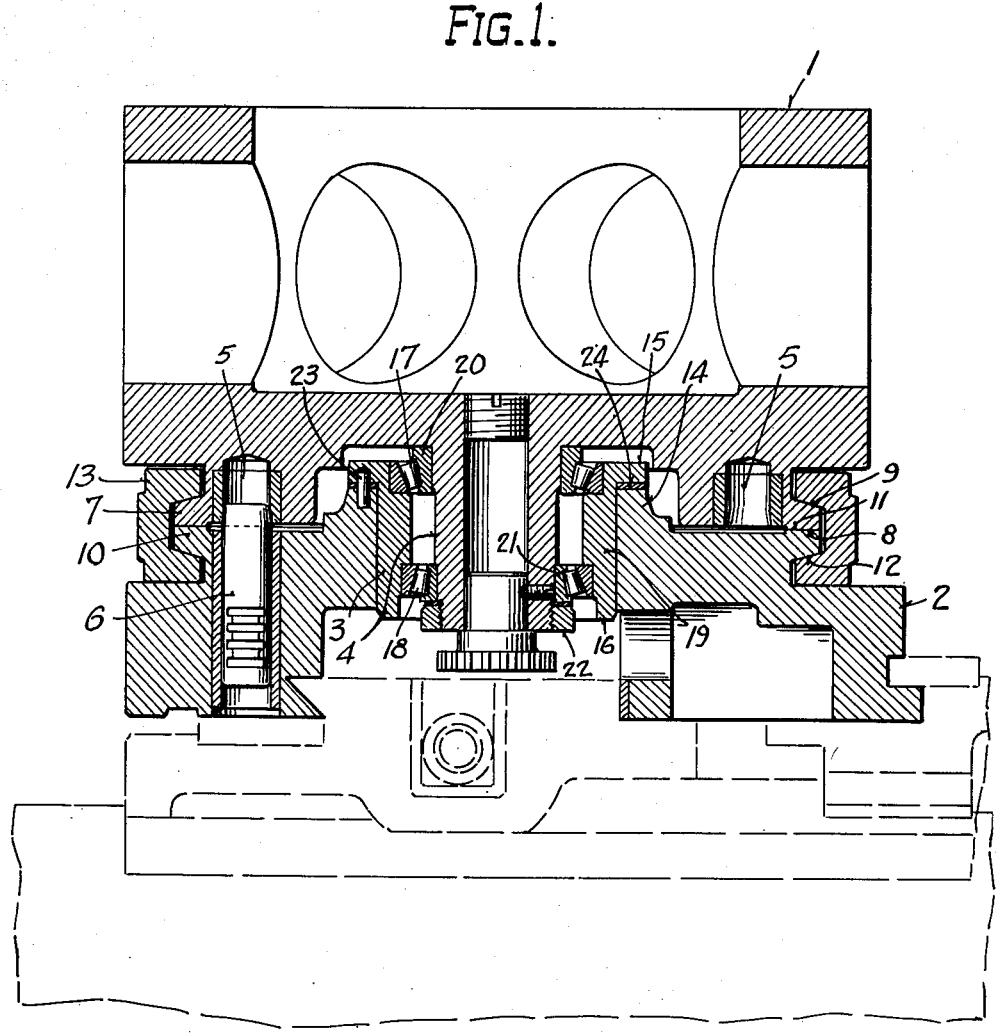
Figure 1 is a vertical axial section through a turret and its assembled mounting.
Figure 2:
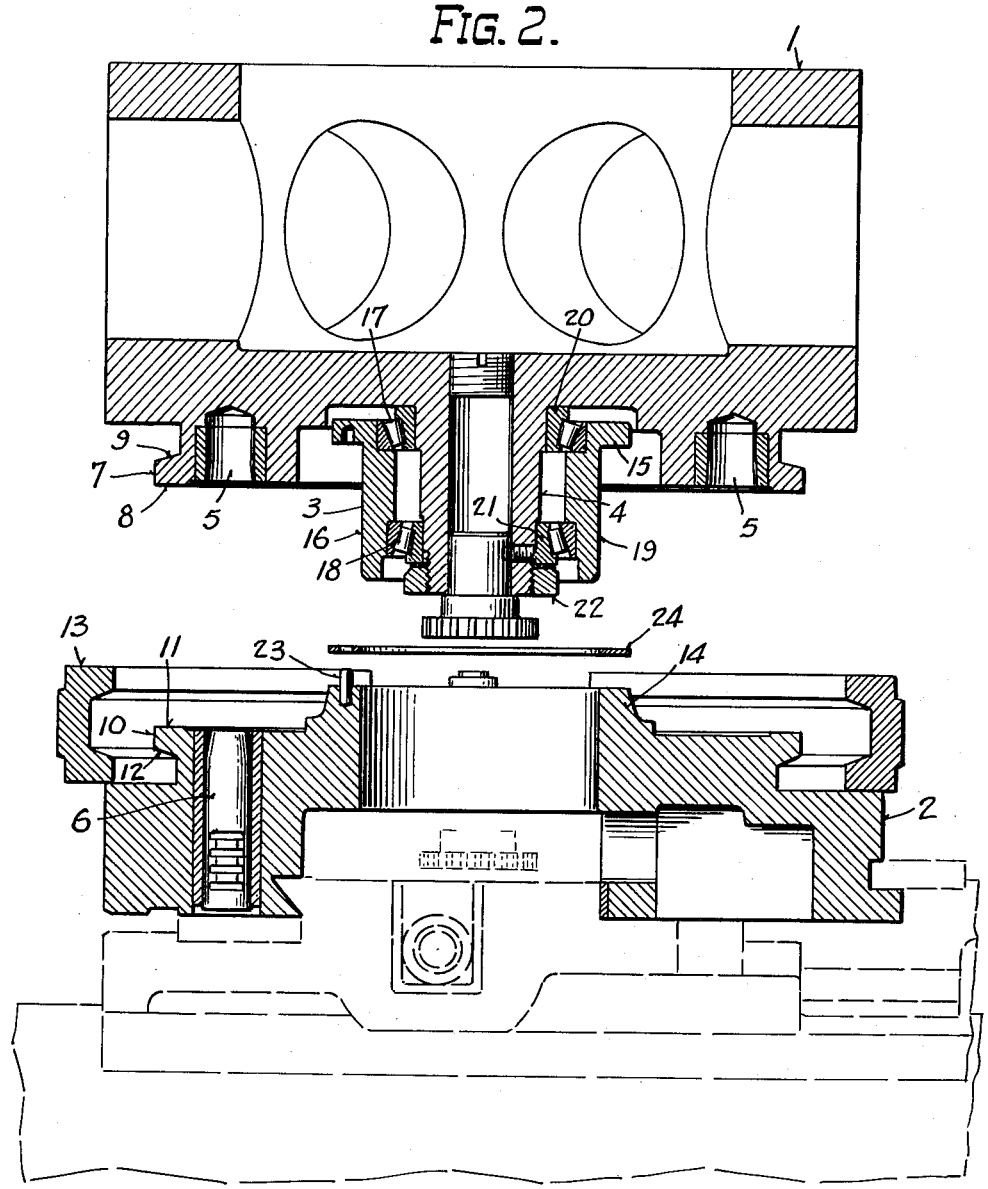
Fig. 2 is a similar view with the parts shown separate prior to assembly.
Figure 3:
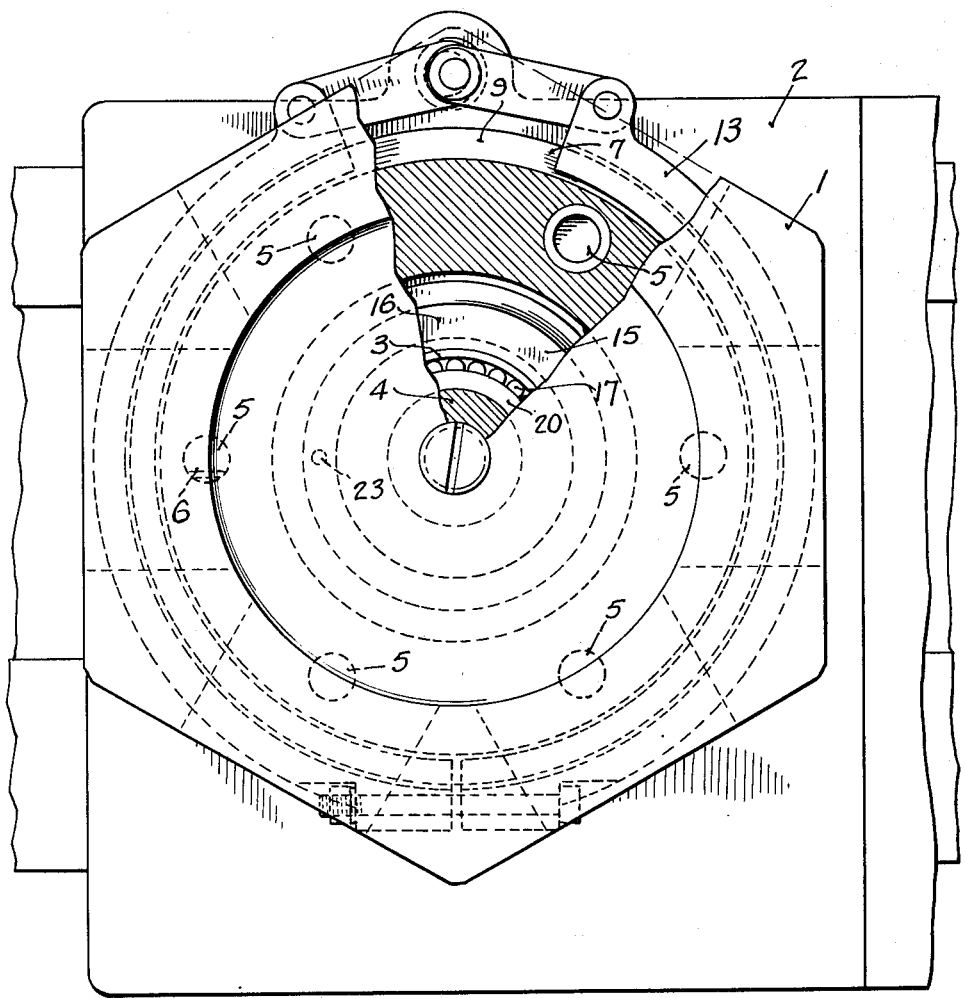
Fig. 3 is a top plan view of the assembled turret with parts broken away and sectioned.

The turret 1 is mounted for rotation upon the turret carriage 2 by means of the bearing cartridge 3 disposed in a bore in the carriage with a vertical axis and into which cartridge the central turret stem 4 extends downwardly.

The turret 1 is generally hexagonal, having a flat plate-like bottom with upstanding side walls in the form of a hexagon. The turret bottom has a vertical hole 5 for each index position and which is adapted to receive the lock pin 6 carried by the turret carriage 2 to lock the turret in a selected indexed position.

A depending circumferential flange 7 on the turret has a downwardly-facing clamping surface 8 and a beveled upper surface 9 adapted to cooperate with a similar circular flange 10 on carriage 2 having a corresponding upwardly facing clamping surface 11 and beveled lower surface 12. The flanges 7 and 10 fit in a clamping ring 13 which is adapted to clamp the same together to hold the turret at any selected indexed position.

The carriage 2 has an upwardly projecting circular flange 14 with a central bore therein for receiving the cartridge 3 and providing a flat top support for a circumferential flange 15 on the upper end of the cartridge to support the cartridge thereon.

The cartridge 3 comprises a stationary outer sleeve 16 carrying a pair of opposed preferably pre-loaded tapered roller bearings 17 and 18 set into the opposite ends thereof. The outer sleeve 16 has the flange 15 which supports the cartridge, and a generally cylindrical body 19 which is machined and ground to fit in the bore in the carriage.

The inner rotary cone 20 of upper bearing 17 fits around the turret stem 4 and has its upper surface engaging the underside of the turret bottom to support the turret on the bearing. The corresponding inner rotary cone 21 of lower bearing 18 fits around the turret stem 4 and is supported by a collar 22 threaded onto the lower end of the stem 4 and screwed to a tightness which pre-loads the bearings a given amount and secures the turret in place on the bearing as a support.

A vertical pin 23 extending upwardly from flange 14 engages in a hole in flange 15 and serves to retain the outer sleeve 16 of the bearing cartridge against turning.

In assembling the mounting, the bearing cartridge 3 with the tapered roller bearings is first assembled on the turret stem 4 and the bearings pre-loaded and secured in place by collar 22 threaded upon the end of the stem. The turret and its bearing cartridge are then positioned on the carriage 2 with the cartridge fitting reasonably tight in the bore in the carriage to center the turret, and the clamping face 8 of flange 7 resting on clamping face 11 of the carriage.

The clamping faces 8 and 11 are then scraped or lapped to fit each other accurately while the turret is turned in the bearing cartridge 3 so that the clamping surfaces are true relative to the bearing support for the turret.

After the clamping surfaces 8 and 11 have been scraped, the turret and cartridge are raised from the carriage and a spacer washer 24 is placed upon the upper surface of flange 14. The turret and bearing cartridge assembly are then again positioned on the carriage, the washer 24 constituting an insert between flanges 14 and 15 and serving to support the assembly on the carriage with a predetermined clearance between the clamping surfaces 8 and 11.

For this purpose the washer 24 is ground to the necessary thickness to produce a uniform clearance preferably of about .002″ between the clamping surfaces 8 and 11.

By machining the upper surface of flange 14 simultaneously with the machining of the bore in the carriage, and by machining and grinding the underside of flange 15 square with respect to the outer surface of the sleeve 16, and employing a washer 24 ground to a uniform thickness, the turret will be supported with a uniform clearance between the clamping surfaces 8 and 11 throughout their common circumference.

The clearance between the clamping surfaces 8 and 11 enables the turret to be turned readily by hand or by the indexing mechanism without friction or drag between the surfaces, and when the turret is in a selected indexed position the clamp ring 13 may be tightened upon flanges 7 and 10 to draw the clamping surfaces into tight engagement and prevent turning of the turret.

The supporting of the turret for rotation solely by upper and lower anti-friction roller or ball bearings and without a bushing contact greatly facilitates the turning and accurate positioning of the turret for indexing.

The accurate scraping of the clamping surfaces with the turret mounted in its bearings insures alignment and centering of the surfaces relative to the center of rotation for the turret. Heretofore, it has been necessary to scrape the clamping surfaces without the bearing in place and this has resulted in considerable inaccuracy in the indexing of the turret.

In order to obtain the required accuracy with respect to the indexing of tools in a lathe it is ordinarily necessary to index the turret accurately to within less than about .0001" variance at 8 inches from the center. The present construction will index the turret to an accuracy well within the limit referred to, whereas former constructions were unable to consistently obtain such accuracy.

The method of the invention may be carried out with various turret constructions wherein the bearing is mounted to be adjustably raised and is constructed to provide for its use during the method as stated.

I claim:

1. In the mounting of turrets for lathes and the like in which the turret is supported for rotation on a base member by a central anti-friction bearing and adapted to be clamped against rotation by engagement of a circular clamping surface thereon with a corresponding opposed stationary clamping surface on the support for the turret, assembling the turret and its bearing with the support under conditions of adjustment wherein the clamping surfaces are in engagement and the turret is free to rotate, scraping the clamping surfaces to fit the same to each other while rotating the turret in its bearing on the same axis of rotation as the final axis of rotation for the turret in service, and thereafter adjusting the turret support to provide a predetermined small uniform clearance between said clamping surfaces for free rotation of the turret on said bearing.

2. In the mounting of turrets for lathes and the like in which the turret is supported for rotation on a base member by a central anti-friction bearing and adapted to be clamped against rotation by engagement of a circular clamping surface thereon with a corresponding opposed stationary clamping surface on the support for the turret, assembling the turret and its bearing with the support under conditions of adjustment wherein the clamping surfaces are in engagement and the turret is free to rotate, scraping the clamping surfaces to fit the same to each other while rotating the turret in its bearing on the same axis of rotation as the final axis of rotation for the turret in service, and thereafter adjusting the height of said bearing relative to the support to provide a predetermined small uniform clearance between said clamping surfaces for free rotation of the turret on said bearing.

VIGO von KROGH SUNDT.

REFERENCES CITED

The following references are of record in the file of this patent:

UNITED STATES PATENTS

| Number | Name | Date |
|---|---|---|
| 1,446,829 | Burrell et al. | Feb. 27, 1923 |
| 1,953,876 | Burrell | Apr. 3, 1934 |
| 1,970,276 | Bullard | Aug. 14, 1934 |
| 2,037,206 | Boden | Apr. 14, 1936 |
| 2,135,639 | Gorham | Nov. 8, 1938 |
| 2,370,367 | Marsilius | Feb. 27, 1945 |
| 2,417,366 | Kylin et al. | Mar. 11, 1947 |
| 2,445,386 | Darash | July 20, 1948 |

FOREIGN PATENTS

| Number | Country | Date |
|---|---|---|
| 524,239 | Great Britain | Aug. 1, 1940 |